UNITED STATES PATENT OFFICE.

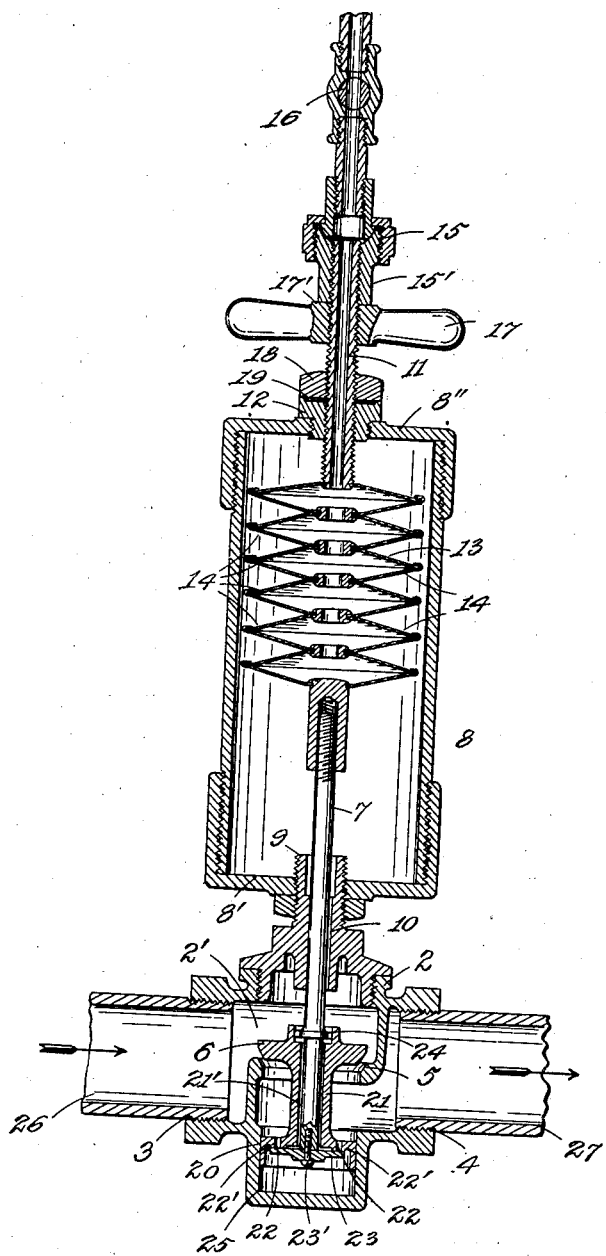

THOMAS M. WILKINS, OF SEATTLE, WASHINGTON, ASSIGNOR TO AUTOMATIC BOILER FEED COMPANY.

PRESSURE-CONTROLLING VALVE.

No. 826,637.

Specification of Letters Patent.

Patented July 24, 1906.

Application filed December 5, 1904. Renewed May 1, 1906. Serial No. 314,688.

*To all whom it may concern:*

Be it known that I, THOMAS M. WILKINS, a citizen of the United States, residing at Seattle, in the county of King and State of Washington, have invented certain new and useful Improvements in Pressure-Controlling Valves, of which the following is a specification, reference being had therein to the accompanying drawing.

The object of this invention is to provide a simple and inexpensive means or apparatus for sensitively and reliably regulating the opening and closing of a valve by the opposing action of two fluids for the purpose of maintaining one of these fluids at a constant pressure or at a pressure relative to that of the other fluid.

The several features of the invention and the advantages arising from their use conjointly or otherwise will appear in the following description, taken in connection with the accompanying drawing, which shows a vertical sectional view of a valve and controlling devices therefor embodying my invention.

The numeral 2 represents a valve-casing provided, as usual, with an inlet-opening 3 and a discharge-opening 4 and having an intermediate valve-seat 5. A registering valve 6 is provided for this seat and has a stem 7, which extends into a cylinder 8, rigidly secured to the said casing in any suitable manner, as by providing a screw-threaded neck 9 upon the latter, which engages in corresponding threads formed in the bottom head 8' of the cylinder. Communication is made between the inside of this cylinder and the chamber 2' of said casing by a passage 10, extending through the connecting-neck. Projecting through the top head 8" of the cylinder is an externally-screw-threaded tube 11 and which may advantageously be made to pass through a bushing 12.

Interposed between and fixedly connected to the valve-stem and the said tube is an accordion-shaped member 13, which is comprised of a plurality of resilient circular plates or diaphragms 14, severally connected in couples at their peripheries and in proximity of their axes, as shown. The upper end of this tube is connected by a union-fitting 15, preferably with a conducting-pipe which is desirably provided with a cock 16, and the sleeve 15' of one of the union parts may be used to fulfil the function of a jam-nut in locking a handle 17 to the said tube, this handle being provided with an apertured hub or boss 17', having an internal screw-thread similar to that upon said tube.

A jam-nut 18 is provided to act with said bushing for securing the tube against rotation after the same has been turned to properly adjust the length normally of the member 13, and this nut may also be used for compressing a packing-gasket 19, seated in a recess of said bushing, in order to make a non-leakable joint thereat.

The valve illustrated is of those with which I am acquainted best suited for carrying out my invention; but I wish it to be understood that I do not limit myself to its use alone. This valve illustrated comprises, in addition to the valve proper, (designated by 6,) a piston 20, integrally connected thereto by a shank 21, having an axial bore 21' of somewhat greater diameter than that of the inclosed portion of the valve-stem, thus providing an annular passage-way extending the entire length of the valve and its piston. The piston is apertured at 22, and downwardly-protruding marginal flanges 22' are severally provided for these apertures. 23 is a cover-plate secured to the lower end of the said valve-stem, as by a screw 23'. Upon this stem at a distance slightly greater than the length of the aforementioned bore 21' is a collar 24, also of greater diameter than the said bore. A cylindrical bore 25 is provided in the case 2 for the reception of the said piston.

It is obvious from the construction of the described valve and its operative parts that it will be seated when the stem 7 thereof is depressed and in so doing removes the cover-plate 23 from the apertures 22 during the downward travel of the valve while the fluid under the piston escapes into the discharge-opening 4. The valve-stem, however, in being raised through the distension of the bellows member 13 first draws the cover-plate to close the apertures of the piston and removes the collar 24 from the mouth of the bore, and thereby admits the fluid through the latter to beneath the piston, where it acts to oppose the downward pressure of the steam against the valve, so as to be easily raised from its seat.

The operation of the controlling apparatus will be best understood from description of a specific application of the invention for regulating the admission of steam to a boiler feed-pump according to the required duty. In such a service the valve inlet-opening 3 would be connected by a pipe 26 with the source of steam-supply and the discharge-opening 4 by a pipe 27 with the steam-chest of the pump, while the pipe 15 would be connected with the pump's water-discharge pipe. Steam is admitted under full boiler-pressure through the passage-way aforementioned into the cylinder 8 and acts continuously upon the outer surface of the bellows 13 and tends to collapse the same to elevate the valve from its seat and admit steam to actuate the pump. The internal pressure of the water upon the bellows acts to further expand the same to close the valve and make the pump inoperative. The length of the bellows is regulated by first closing the cock 16, disconnecting the parts of the union and withdrawing the jam-nut 18 from the bush-piece 12, when the tube 11 can be turned with the handle 17 to screw the same inwardly or outwardly of the casing 8 and regulate the extension of the bellows so that it will be capable under the action of the opposing external steam and internal water pressures to meet the required conditions. The adjustment being attained, the various disconnected parts are returned to their former positions and the device is ready for operation.

The advantages, among others, of the invention are: First, there are no stuffing-boxes through which the operative parts extend and with a consequent absence of friction; second, the controlling-bellows is extremely sensitive in its action, and the valve is opened and closed with great rapidity; third, the apparatus involves no springs, weights, or the like which are either liable of derangement or variation in power.

Having described my invention, what I claim as new, and desire to secure by Letters Patent, is—

1. The combination with a valve and its casing, of a cylinder communicatively connected with said valve-casing, a bellows member positioned interiorly of said cylinder, mechanical connection between said valve and the bellows, and a tube communicating with the interior of the bellows and extending outwardly through the cylinder, substantially as described.

2. The combination with a valve and its casing, of a cylinder communicatively connected with said casing, a bellows member positioned within said cylinder and connected to said valve by a stem, an adjusting-tube communicatively connected to the said bellows, and means to secure the said tube at any set position, substantially as described.

3. The combination with a valve, a casing for said valve, a valve-stem connected to a bellows, said bellows which is positioned internally of a cylinder, said cylinder, an externally-screw-threaded tube connected to the bellows and extending through a screw-threaded aperture of the cylinder-head, an adjusting-handle on said tube, and a jam-nut for locking the said tube in a set position, substantially as described.

4. In a device of the character described the combination with a valve and its casing, of a bellows, a stem connecting said valve and bellows, and a tube making communicative connection with the bellows and adapted to be connected with the water-discharge pipe of a pump, substantially as described.

5. In a device of the character described, the combination with a valve and its casing, of a cylinder mounted on said casing, a bellows arranged within said cylinder, a stem connected to the valve and extending into the cylinder and connected to said bellows, an adjustable tube communicatively connected to the bellows and extending through the head of the cylinder to extend or contract the bellows, and means for locking the tube in its adjusted position.

In testimony whereof I affix my signature in presence of two witnesses.

THOMAS M. WILKINS.

Witnesses:
PIERRE BARNES,
DAVID D. CONNELL.